US009539897B2

(12) United States Patent
Yoshinaga et al.

(10) Patent No.: US 9,539,897 B2
(45) Date of Patent: Jan. 10, 2017

(54) FUEL CELL VEHICLE

(71) Applicant: HONDA MOTOR CO., LTD., Minato-Ku, Tokyo (JP)

(72) Inventors: Nariyuki Yoshinaga, Utsunomiya (JP); Hideharu Naito, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/374,586

(22) PCT Filed: Jan. 18, 2013

(86) PCT No.: PCT/JP2013/050876
§ 371 (c)(1),
(2) Date: Jul. 25, 2014

(87) PCT Pub. No.: WO2013/111669
PCT Pub. Date: Aug. 1, 2013

(65) Prior Publication Data
US 2014/0367182 A1 Dec. 18, 2014

(30) Foreign Application Priority Data

Jan. 26, 2012 (JP) .................................. 2012-013630

(51) Int. Cl.
*B60K 1/00* (2006.01)
*B60L 11/18* (2006.01)
(Continued)

(52) U.S. Cl.
CPC .............. *B60K 15/067* (2013.01); *B60K 1/04* (2013.01); *B60K 11/04* (2013.01); *B60L 11/1805* (2013.01);
(Continued)

(58) Field of Classification Search
CPC .... B60K 6/32; B60L 11/1896; B60L 11/1898; H01M 8/2475; H01M 8/0273; H01M 8/0276
See application file for complete search history.

(56) References Cited

U.S. PATENT DOCUMENTS 5,607,786 A * 3/1997 Guthrie et al. ............... 429/457
6,223,843 B1 * 5/2001 O'Connell et al. ........ 180/65.22
(Continued)

FOREIGN PATENT DOCUMENTS

JP 2004-063173 A 2/2004
JP 2006-164716 A 6/2006
(Continued)

*Primary Examiner* — J. Allen Shriver, II
*Assistant Examiner* — Travis Coolman
(74) *Attorney, Agent, or Firm* — Carrier Blackman & Associates, P.C.; Joseph P. Carrier; Jeffrey T. Gedeon

(57) ABSTRACT

In this fuel cell vehicle, a radiator, a protruding region of a casing, and a connecting bar of a fuel cell stack are arranged in a front box in the listed order from the front toward the rear in the direction in which the vehicle travels. A first end plate and a second end plate are fixed directly on a frame member via mounting members, and the frame member is fixed to a vehicle body frame. After an external load has been transmitted from the radiator and the protruding region of the casing to the first end plate and the second end plate, the external load is transmitted to the vehicle body frame via a side frame.

5 Claims, 10 Drawing Sheets

(51) Int. Cl.
  *B60K 15/067*  (2006.01)
  *B60K 1/04*    (2006.01)
  *B60K 11/04*   (2006.01)
  *H01M 8/24*    (2016.01)

(52) U.S. Cl.
  CPC ........ *B60L 11/1892* (2013.01); *B60L 11/1896* (2013.01); *B60L 11/1898* (2013.01); *H01M 8/2475* (2013.01); *B60K 2001/001* (2013.01); *B60K 2001/005* (2013.01); *B60K 2001/0411* (2013.01); *B60Y 2306/01* (2013.01); *H01M 2250/20* (2013.01); *Y02E 60/50* (2013.01); *Y02T 90/32* (2013.01); *Y02T 90/34* (2013.01)

(56) References Cited

U.S. PATENT DOCUMENTS

| | | | | |
|---|---|---|---|---|
| 6,819,066 | B2* | 11/2004 | Ishikawa et al. | 318/139 |
| 6,994,178 | B2* | 2/2006 | Mizuno | 429/430 |
| 7,144,039 | B2* | 12/2006 | Kawasaki et al. | 280/784 |
| 7,971,670 | B2* | 7/2011 | Shiomi et al. | 180/65.31 |
| 8,051,934 | B2* | 11/2011 | Kiya et al. | 180/68.5 |
| 8,317,907 | B2* | 11/2012 | Martinchek | H01M 8/04141 429/413 |
| 8,408,345 | B2* | 4/2013 | Ohashi | 180/68.4 |
| 8,616,319 | B2* | 12/2013 | Yokoyama et al. | 180/68.5 |
| 9,093,698 | B2* | 7/2015 | Tanaka | H01M 8/2475 |
| 2007/0284167 | A1* | 12/2007 | Watanabe et al. | 180/68.5 |
| 2009/0269627 | A1* | 10/2009 | Zhang | H01M 8/02 429/436 |
| 2010/0147608 | A1* | 6/2010 | Okabe | 180/65.31 |

FOREIGN PATENT DOCUMENTS

| | | |
|---|---|---|
| JP | 2007-258164 A | 10/2007 |
| JP | 2007-335184 A | 12/2007 |
| JP | 2009-137443 A | 6/2009 |

\* cited by examiner

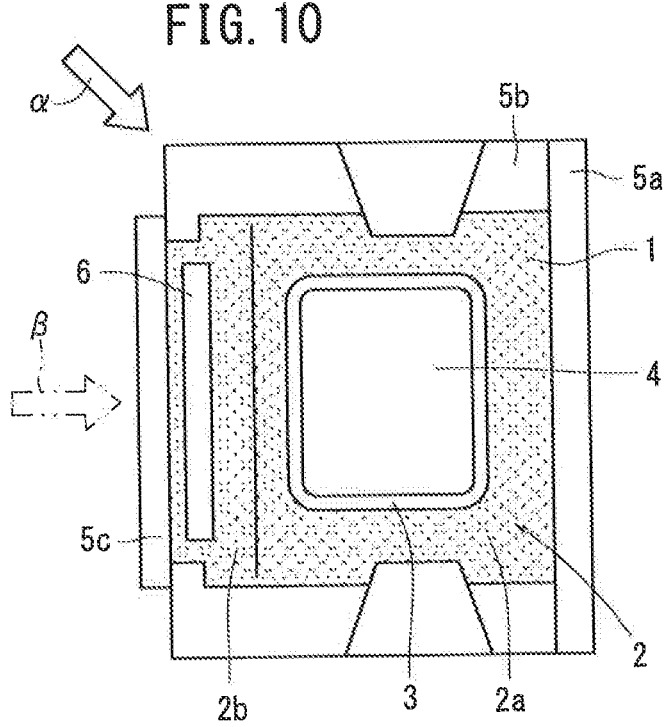

FUEL CELL VEHICLE

TECHNICAL FIELD

The present invention relates to a fuel cell vehicle including a fuel cell stack formed by stacking a plurality of fuel cells in a vehicle width direction. Each of the fuel cells generates electrical energy by electrochemical reactions of a fuel gas and an oxygen-containing gas.

BACKGROUND ART

For example, a solid polymer electrolyte fuel cell employs a polymer ion exchange membrane as an electrolyte membrane, and the electrolyte membrane is interposed between an anode and a cathode to form a membrane electrode assembly (MEA). The membrane electrode assembly and a pair of separators sandwiching the membrane electrode assembly make up a power generation cell. In the fuel cell of this type, in use, typically, a predetermined number of the power generation cells are stacked together to form a fuel cell stack mounted in a vehicle.

In a fuel cell vehicle equipped with the fuel cell stack, for example, when an impact (external load) from the front side is applied to the fuel cell stack, it is required to protect components of the fuel cell stack or the like.

For this purpose, for example, an electric vehicle disclosed in Japanese Laid-Open Patent Publication No. 2009-137443 is known. In the electric vehicle, as shown in FIG. 10, a space inside a motor room 1 is divided into an upper space and a lower space by a base panel 2. Though not shown, a traction motor as a rotary electric machine and an air compressor are placed in the lower space of the motor room 1, and a fuel cell stack 3 and a power control unit (PCU) 4 are placed in the upper space of the motor room 1.

Further, the motor room 1 includes a dash panel 5a provided at an intermediate position in the longitudinal direction of the vehicle and a pair of fender side inner panels 5b provided on both sides in the width direction of the vehicle, and the motor room 1 is formed into a frame shape as a whole.

The base panel 2 includes a flat plate section 2a having a substantially flat plate shape in a horizontal direction, and a curved plate section 2b connected to a front end of the flat plate section 2a and which is curved to get lower toward the front side in order to avoid a radiator 6 positioned on the upper side.

An upper front end surface, which is an end of the curved plate section 2b on the opposite side of the vehicle compartment, is directly joined/fixed to the lower edge of a front side lower frame 5c by welding or the like. The front side lower frame 5c is provided at the front end of the vehicle, and the front side lower frame 5c is joined to the lower front ends of the pair of fender side inner panels 5b so as to bridge a space between the lower front ends in the vehicle width direction. Further, upper front ends of the pair of fender side inner panels 5b are coupled by an upper front panel (not shown) provided at the front end of the vehicle.

Further, a rear end of the flat plate section 2a (i.e., an end closer to the vehicle compartment in the longitudinal direction of the vehicle) is directly joined/fixed to the front surface of the dash panel 5a by welding or the like in the horizontal direction. Both ends of the flat plate section 2a in the width direction of the vehicle are directly joined/fixed to respective inner surfaces of the pair of fender side inner panels 5b in the width direction by welding or the like in the horizontal direction. The rear end and both ends in the width direction of the flat plate section 2a are directly connected to the dash panel 5a and the fender side inner panels 5b substantially without any gaps therebetween or with some gaps therebetween.

According to the disclosure, in the electric vehicle having the structure, as described above, for example, in the case where an external force is applied from the outside in a direction indicated by an arrow α by a collision or the like, the external force can be borne cooperatively by members including the base panel 2. Therefore, it becomes possible to easily prevent an excessive force from being applied to the members of the vehicle body. Even in the case where the base panel 2 is collapsed, it is possible to easily prevent a large force from being externally applied to components in the motor room 1, such as components placed on the base panel 2 (e.g., the fuel cell stack 3 or the like), and effectively prevent damages to the components.

SUMMARY OF INVENTION

However, in Japanese Laid-Open Patent Publication No. 2009-137443, when an impact is applied to the radiator 6 in a direction indicated by an arrow β from the front side of the electric vehicle, the radiator 6 may be moved/deformed backward to directly collide with the fuel cell stack 3. Consequently, a considerably large external load may be directly applied to the fuel cell stack 3 undesirably.

The present invention has been made to solve the problem of this type, and an object of the present invention is to provide a fuel cell vehicle having simple structure in which it is possible to suitably prevent an external load from being directly applied to fuel cells and reliably protect the fuel cells.

According to the present invention, there is provided a fuel cell vehicle including a fuel cell stack formed by stacking a plurality of fuel cells in a vehicle width direction. Each of the fuel cells generates electrical energy by electrochemical reactions of a fuel gas and an oxygen-containing gas.

The fuel cell stack includes end plates provided at both ends of the fuel cells in the stacking direction. At least one of tightening members coupling the end plates is disposed on a front side of the fuel cell stack in a vehicle traveling direction so as to be spaced from the fuel cells.

In the order from the front side to the rear side in the vehicle traveling direction, a fuel cell cooling radiator, a load receiver member, and the tightening member are provided inside the vehicle. The end plates are fixed to a vehicle body frame.

Thus, when an external load is applied from the front side in the vehicle traveling direction, after the external load is transmitted from at least the fuel cell cooling radiator and the load receiver member to the end plates, the external load is transmitted to the vehicle body frame.

Further, in the fuel cell vehicle, it is preferable that after the external load is transmitted from the fuel cell cooling radiator, the load receiver member, and the tightening member to the end plates, the external load should be transmitted to the vehicle body frame.

Further, in the fuel cell vehicle, it is preferable that a casing containing the fuel cell stack should be provided, and the casing should be partially provided on the front side of the fuel cell stack in the vehicle traveling direction to form the load receiver member.

In the present invention, when the external load is applied to the fuel cell vehicle from the front side in the vehicle traveling direction, after the external load is transmitted from the fuel cell cooling radiator, the load receiver member, and the tightening member to the end plates, the external load is transmitted from the fuel cell frame to the vehicle body frame.

In the structure, no external load is directly applied to the fuel cells of the fuel cell stack, and the external load can be reliably released to the vehicle body frame. Accordingly, with the simple structure, it becomes possible to suitably prevent the external load from being directly applied to the fuel cells, and reliably protect the fuel cell.

BRIEF DESCRIPTION OF DRAWINGS

FIG. 10 is a plan view showing main components of an electric vehicle disclosed in Japanese Laid-Open Patent Publication No. 2009-137443.

DESCRIPTION OF EMBODIMENTS

Figure 1:
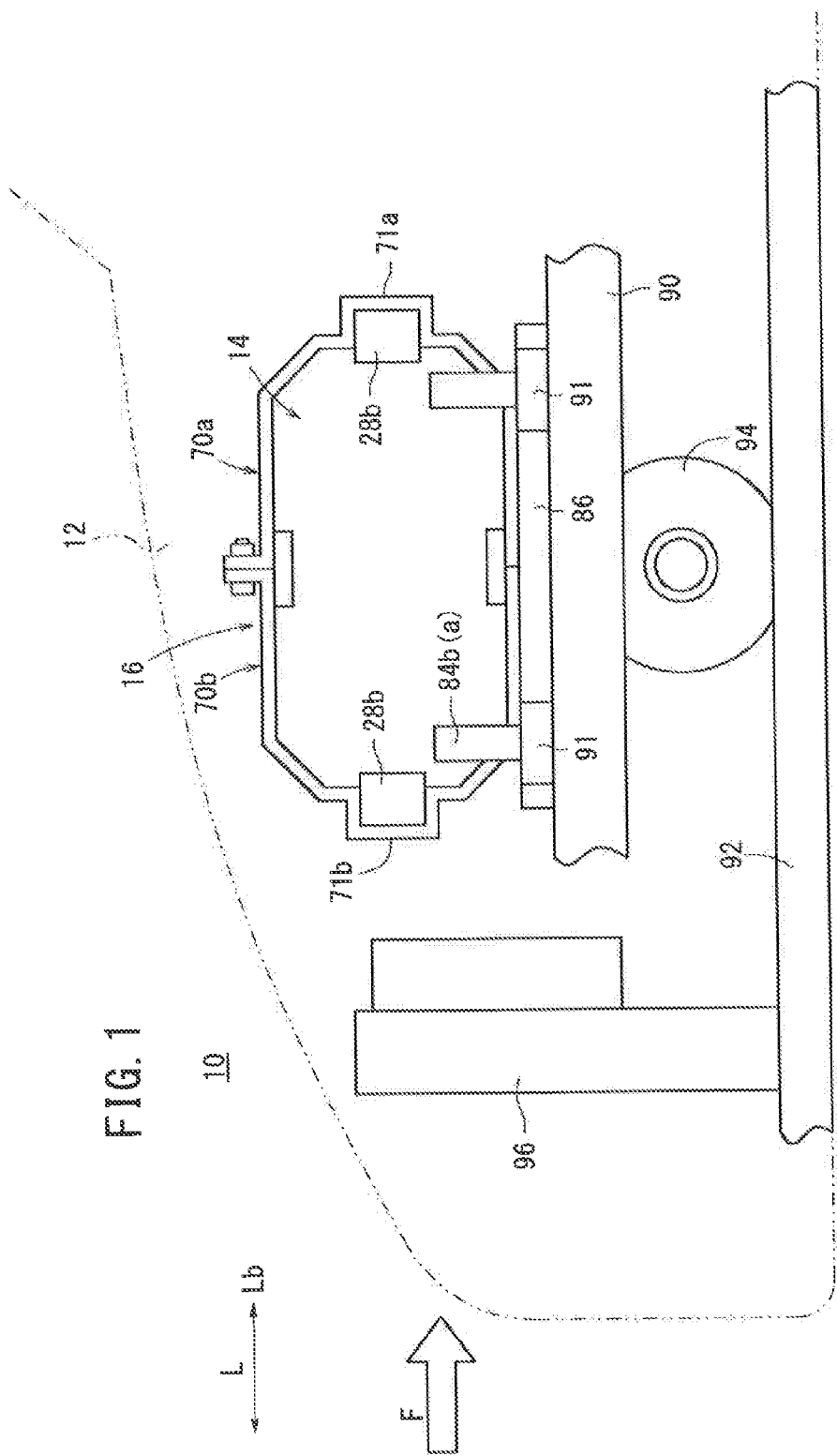
FIG. 1 is a side view showing a fuel cell vehicle according to a first embodiment of the present invention.
Figure 2:
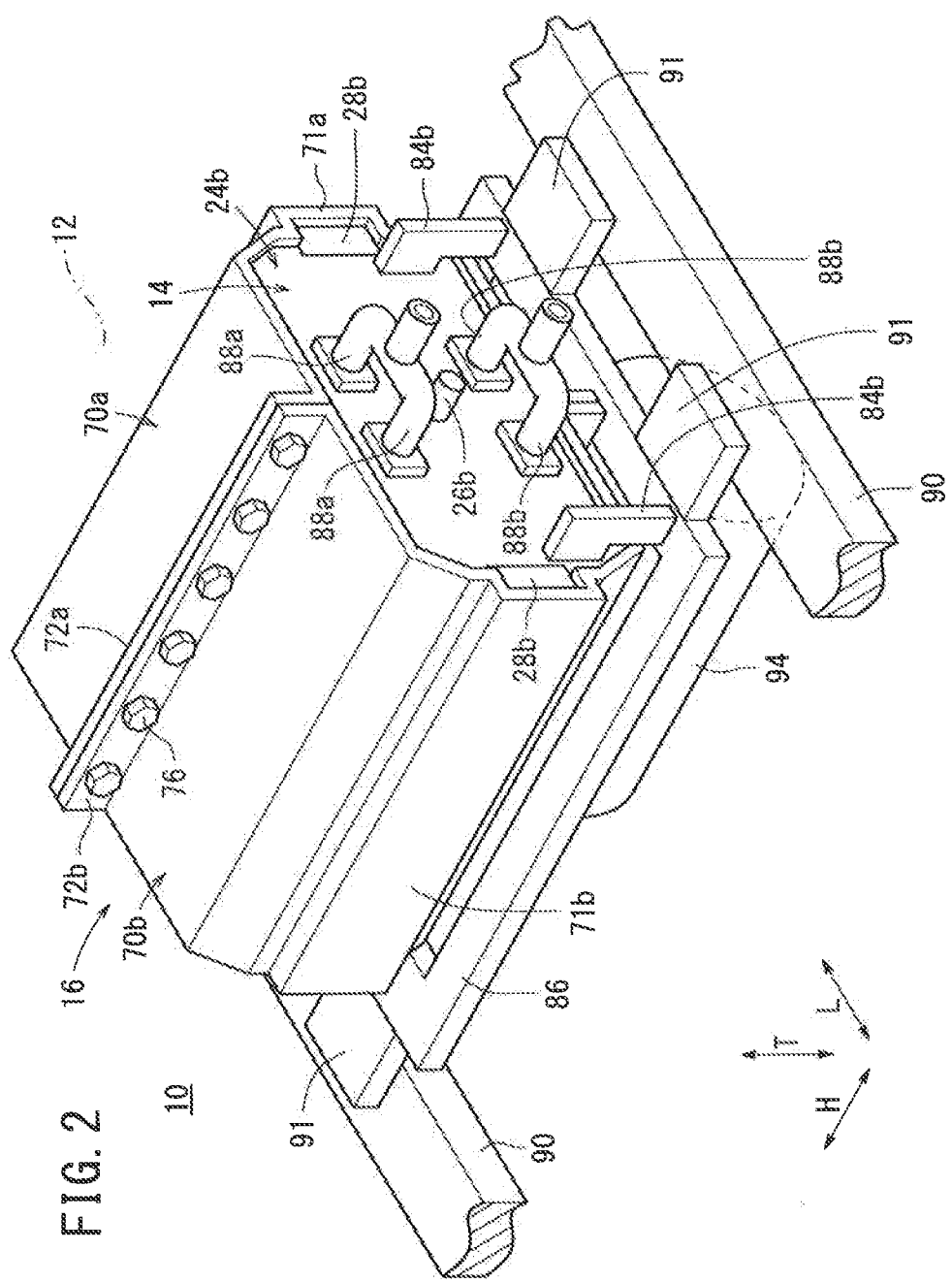
FIG. 2 is a perspective view showing main components of the fuel cell vehicle.

As shown in FIGS. 1 and 2, a fuel cell vehicle 10 according to a first embodiment of the present invention includes a fuel cell stack 14 placed in a front box (so called motor room) (an inside of a vehicle body) 12.

Figure 3:
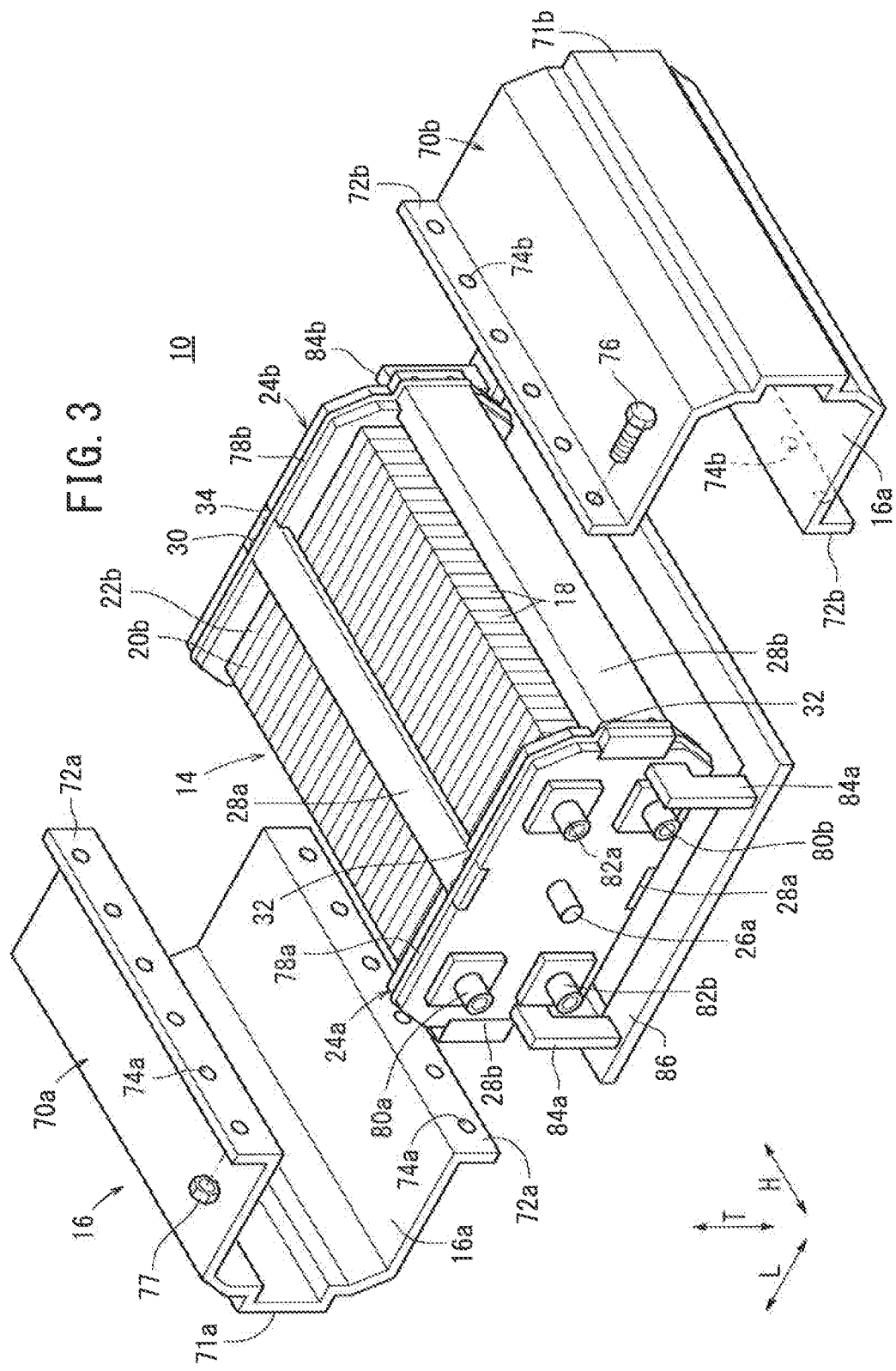
FIG. 3 is an exploded perspective view showing main components of a fuel cell stack and a casing of the fuel cell vehicle.

The fuel cell stack 14 is placed in a casing 16, and as shown in FIG. 3, the fuel cell stack 14 is formed by stacking a plurality of fuel cells 18 in a vehicle width direction of the fuel cell vehicle 10 indicated by an arrow H intersecting with a vehicle length direction of the fuel cell vehicle 10 indicated by an arrow L.

Figure 4:
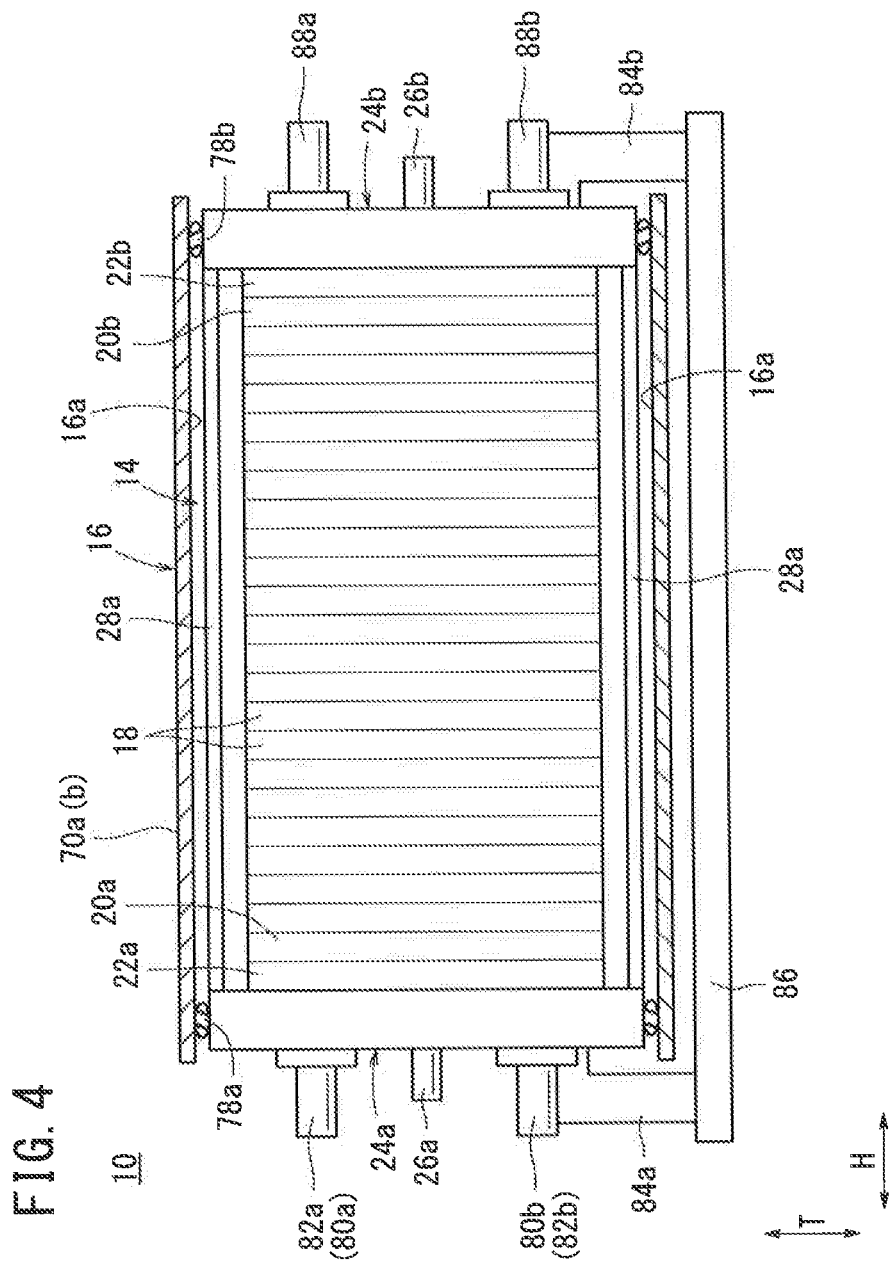
FIG. 4 is a cross sectional side view showing the fuel cell stack and the casing.

As shown in FIGS. 3 and 4, in the fuel cell stack 14, the plurality of fuel cells 18 are stacked together upright in the horizontal direction indicated by the arrow H. At one end of the fuel cells 18 in the stacking direction, a first terminal plate 20a is provided. A first insulating plate 22a is provided outside the first terminal plate 20a, and a first end plate 24a is provided outside the first insulating plate 22a. At the other end of the fuel cells 18 in the stacking direction, a second terminal plate 20b is provided. A second insulating plate 22b is provided outside the second terminal plate 20b, and a second end plate 24b is provided outside the second insulating plate 22b.

A first power output terminal 26a extends from a central position of the first end plate 24a. The first power output terminal 26a is connected to the first terminal plate 20a. A second power output terminal 26b extends from a central position of the second end plate 24b. The second power output terminal 26b is connected to the second terminal plate 20b.

The first end plate 24a and the second end plate 24b have a substantially rectangular shape elongated in a lateral direction, and the corners of the first end plate 24a and the second end plate 24b are cut away. However, the shapes of the first end plate 24a and the second end plate 24b are not limited to these shapes. For example, the first end plate 24a and the second end plate 24b may have a rectangular or square shape.

Both ends of each of coupling bars (tightening members) 28a are fixed to intermediate positions of respective long sides of the first end plate 24a and the second end plate 24b using screws 30. Both end of each of coupling bars (tightening members) 28b are fixed to intermediate positions of respective short sides of the first end plate 24a and the second end plate 24b using screws 30. A tightening load is applied to the stacked fuel cells 18 of the fuel cell stack 14 in the stacking direction indicated by the arrow H by the coupling bars 28a, 28b.

As shown in FIG. 3, ends of the coupling bars 28a, 28b adjacent to the first end plate 24a are fitted into recesses 32 formed in the respective sides of the first end plate 24a.

Ends of the coupling bars 28a, 28b adjacent to the second end plate 24b are fitted into recesses 34 formed in the respective sides of the second end plate 24b.

The outer surface of the coupling bar 28a is provided in the same plane with the long sides of the first end plate 24a and the second end plate 24b without any gap. Each of the coupling bar 28b protrudes outward beyond the short sides of the first end plate 24a and the second end plate 24b. One of the coupling bars 28b is disposed on the front side in the traveling direction of the vehicle indicated by the arrow L so as to be spaced from the fuel cells 18. The coupling bar 28b has the same thickness as the coupling bar 28a, and at least part of the coupling bar 28b, e.g., the central portion in the thickness direction may be bulged outward to protrude outward beyond the short sides of the first end plate 24a and the second end plate 24b.

Figure 5:
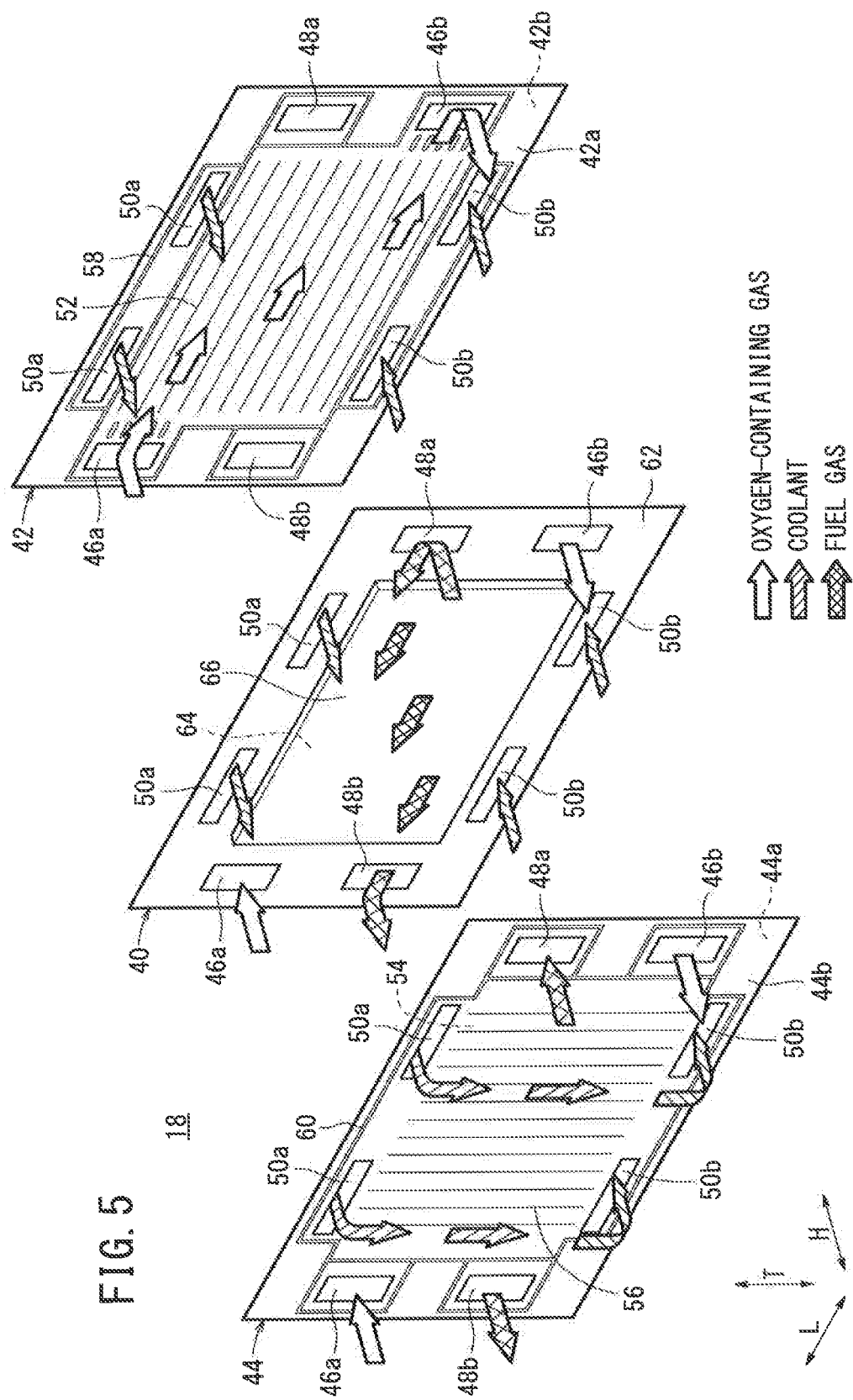
FIG. 5 is an exploded perspective view showing main components of a fuel cell of the fuel cell stack.

As shown in FIG. 5, the fuel cell 18 has a laterally elongated rectangular shape and is formed by sandwiching a membrane electrode assembly 40 between a first separator 42 and a second separator 44. The first separator 42 and the second separator 44 are metal separators made of, e.g., metal plates such as steel plates, stainless steel plates, aluminum plates, plated steel sheets, or carbon separators.

At one end of the fuel cell 18 in a horizontal direction indicated by an arrow L in FIG. 5, an oxygen-containing gas supply passage 46a for supplying an oxygen-containing gas and a fuel gas discharge passage 48b for discharging a fuel gas such as a hydrogen-containing gas are arranged in a vertical direction indicated by an arrow T. The oxygen-containing gas supply passage 46a and the fuel gas discharge passage 48b extend through the fuel cell 18 in the stacking direction indicated by the arrow H.

At the other end of the fuel cell 18 in the direction indicated by the arrow L, a fuel gas supply passage 48a for supplying the fuel gas and an oxygen-containing gas discharge passage 46b for discharging the oxygen-containing gas are arranged in the direction indicated by the arrow T. The fuel gas supply passage 48a and the oxygen-containing gas discharge passage 46b extend through the fuel cell 18 in the direction indicated by the arrow H.

At an upper end of the fuel cell 18 in the direction indicated by the arrow T, a pair of coolant supply passages 50a for supplying a coolant are provided. At a lower end of the fuel cell 18 in the direction indicated by the arrow T, a pair of coolant discharge passages 50b for discharging the coolant are provided.

The first separator 42 has an oxygen-containing gas flow field 52 on its surface 42a facing the membrane electrode assembly 40. The oxygen-containing gas flow field 52 is connected to the oxygen-containing gas supply passage 46a and the oxygen-containing gas discharge passage 46b.

The second separator 44 has a fuel gas flow field 54 on its surface 44a facing the membrane electrode assembly 40. The fuel gas flow field 54 is connected to the fuel gas supply passage 48a and the fuel gas discharge passage 48b.

A coolant flow field 56 is formed between a surface 42b of the first separator 42 of one of the adjacent fuel cells 18 and a surface 44b of the second separator 44 of the other of the adjacent fuel cells 18. The coolant flow field 56 is connected to the coolant supply passages 50a and the coolant discharge passages 50b.

Seal members 58, 60 are formed integrally with the first separator 42 and the second separator 44, respectively. Alternatively, seal members 58, 60 separate from the first separator 42 and the second separator 44 are provided respectively on the first separator 42 and the second separator 44. Each of the seal members 58, 60 is made of seal material, cushion material, or packing material such as an EPDM, an NBR, a fluoro rubber, a silicone rubber, a fluorosilicone rubber, a butyl rubber, a natural rubber, a styrene rubber, a chloroprene rubber, an acrylic rubber, or the like.

The membrane electrode assembly 40 includes a solid polymer electrolyte membrane 62, and a cathode 64 and an anode 66 sandwiching the solid polymer electrolyte membrane 62. The solid polymer electrolyte membrane 62 is formed by impregnating a thin membrane of perfluorosulfonic acid with water, for example.

Each of the cathode 64 and the anode 66 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the cathode 64 and the electrode catalyst layer of the anode 66 are formed on both surfaces of the solid polymer electrolyte membrane 62, respectively.

As shown in FIGS. 2 and 3, the casing 16 includes a plurality of, e.g., two, split members 70a, 70b having split surfaces on the long sides of the fuel cells 18, in the longitudinal direction indicated by the arrow H. The split members 70a, 70b are formed, for example, by press forming of aluminum plates, or press forming of steel plates (stainless steel plates). In the state where the split members 70a, 70b are joined together from sides of the fuel cell stack 14 (in the horizontal direction), the split members 70a, 70b jointly form a tubular shape, in particular, form a polygonal tubular shape corresponding to the outer shape of the fuel cell stack 14.

The split members 70a, 70b include respective projecting portions 71a, 71b on side surfaces (vertical surfaces) thereof extending in the direction indicated by the arrow T. The projecting portions 71a, 71b protrude outwardly on positions corresponding to the respective coupling bars 28b. One of the projecting portions 71b functions as a load receiver member. It should be noted that the casing 16 may be split into three or more parts as necessary.

Flanges 72a, 72a protruding toward the outside (upper and lower sides) are provided at the opened ends of the split member 70a which extend in the length direction of the split member 70a. Each of the flanges 72a forms a split surface. A plurality of holes 74a are formed at predetermined intervals in each of the flanges 72a.

Likewise, flanges 72b protruding toward the outside are provided at the opened ends of the split member 70b which extend in the length direction of the split member 70b. Each of the flanges 72b forms a split surface.

Each of the flanges 72b has a plurality of holes 74b arranged coaxially with the respective holes 74a. Each of bolts 76 is inserted into both of the holes 74a, 74b that are arranged coaxially, and the bolts 76 are screwed into nuts 77 to join the split members 70a, 70b together.

A first seal member 78a is disposed around and placed in close contact with the outer circumference of the first end plate 24a, and a second seal member 78b is disposed around and placed in close contact with the outer circumference of the second end plate 24b.

In the state where the split members 70a, 70b are fixed together, the first seal member 78a is sandwiched between an inner surface 16a of the casing 16 and the outer circumference of the first end plate 24a, and the second seal member 78b is sandwiched between the inner surface 16a of the casing 16 and the outer circumference of the second end plate 24b to thereby keep air-tightness in the casing 16.

As shown in FIG. 3, an oxygen-containing gas supply manifold 80a, an oxygen-containing gas discharge manifold 80b, a fuel gas supply manifold 82a, and a fuel gas discharge manifold 82b are attached to the first end plate 24a. The oxygen-containing gas supply manifold 80a is connected to the oxygen-containing gas supply passage 46a, the oxygen-containing gas discharge manifold 80b is connected to the oxygen-containing gas discharge passage 46b, the fuel gas supply manifold 82a is connected to the fuel gas supply passage 48a, and the fuel gas discharge manifold 82b is connected to the fuel gas discharge passage 48b.

One end of each of a pair of mount members 84a is fixed to the first end plate 24a, and another end thereof is fixed to a fuel cell frame member 86. The first end plate 24a is directly fixed to the frame member 86.

As shown in FIG. 2, a pair of coolant supply manifolds 88a and a pair of coolant discharge manifolds 88b are attached to the second end plate 24b. The coolant supply manifolds 88a are connected to the pair of coolant supply passages 50a, and the coolant discharge manifolds 88b are connected to the pair of coolant discharge passages 50b. The pair of coolant supply manifolds 88a are merged into a single supply pipe structure, and likewise, the pair of coolant discharge manifolds 88b are merged into a single discharge pipe structure.

One end of each of a pair of mount members 84b is fixed to the second end plate 24b, and another end thereof is fixed to the frame member 86. The second end plate 24b is directly fixed to the frame member 86.

Instead of adopting the above structure, all of the manifolds (the oxygen-containing gas supply manifold 80a, the oxygen-containing gas discharge manifold 80b, the fuel gas supply manifold 82a, the fuel gas discharge manifold 82b, the pair of coolant supply manifolds 88a, and the pair of coolant discharge manifolds 88b) may be provided at the first end plate 24a.

As shown in FIGS. 1 and 2, the frame member 86 is fixed to side frames 90, which are parts of the vehicle, using brackets 91. The side frames 90 are parts of a vehicle body frame 92. In addition to a traction motor 94, various types of equipment are provided between the frame member 86 and the vehicle body frame 92, as necessary.

As shown in FIG. 1, in the order from the front side to the rear side in the traveling direction of the vehicle, a fuel cell cooling radiator 96, the projecting portion 71b (load receiver member) of the casing 16, and the coupling bar 28b (tightening member) of the fuel cell stack 14 are arranged in the front box 12.

In the fuel cell vehicle 10 having the above structure, operation of the fuel cell stack 14 will be described below.

Firstly, as shown in FIGS. 3 and 5, an oxygen-containing gas is supplied from the oxygen-containing gas supply manifold 80a to the oxygen-containing gas supply passage 46a. A fuel gas such as a hydrogen-containing gas is supplied from the fuel gas supply manifold 82a to the fuel gas supply passage 48a. Further, as shown in FIGS. 2 and 5, a coolant such as pure water, ethylene glycol, oil, or the like is supplied from the coolant supply manifolds 88a to the coolant supply passages 50a.

Therefore, as shown in FIG. 5, the oxygen-containing gas flows from the oxygen-containing gas supply passage 46a into the oxygen-containing gas flow field 52 of the first separator 42. The oxygen-containing gas flows in the direction indicated by the arrow L, and the oxygen-containing gas is supplied to the cathode 64 of the membrane electrode assembly 40.

In the meanwhile, the fuel gas flows from the fuel gas supply passage 48a into the fuel gas flow field 54 of the second separator 44. The fuel gas moves in the direction indicated by the arrow L, and the fuel gas is supplied to the anode 66 of the membrane electrode assembly 40.

Thus, in the membrane electrode assembly 40, the oxygen-containing gas supplied to the cathode 64, and the fuel gas supplied to the anode 66 are consumed in electrochemical reactions at catalyst layers of the cathode 64 and the anode 66 for generating electricity. As a result, electricity is supplied to the traction motor 94 for allowing traveling of the fuel cell vehicle 10.

Then, the oxygen-containing gas consumed at the cathode 64 flows along the oxygen-containing gas discharge passage 46b in the direction indicated by the arrow H, and the oxygen-containing gas is discharged from the oxygen-containing gas discharge manifold 80b (see FIG. 3). In the meanwhile, the fuel gas consumed at the anode 66 flows along the fuel gas discharge passage 48b in the direction indicated by the arrow H, and the fuel gas is discharged from the fuel gas discharge manifold 82b.

Further, the coolant supplied to the pair of coolant supply passages 50a flows into the coolant flow field 56 formed between the first separator 42 and the second separator 44, and the coolant flows in the direction indicated by the arrow T. After the coolant cools the membrane electrode assembly 40, the coolant flows through the pair of coolant discharge passages 50b, and the coolant is discharged from the coolant discharge manifolds 88b (see FIG. 2).

As described above, electricity is supplied from the fuel cell stack 14 to the fuel cell vehicle 10, whereby the fuel cell vehicle 10 travels. At this time, as shown in FIG. 1, when an external load F as an impact is applied to the fuel cell vehicle 10 from the front side, the front portion of the fuel cell vehicle 10 is deformed inward to deform/move the radiator 96 toward the rear side (indicated by an arrow Lb) in a traveling direction. Therefore, the radiator 96 collides with the projecting portion 71b of the split member 70b of the casing 16.

The coupling bar 28b of the fuel cell stack 14 is provided on the back surface of the projecting portion 71b. The coupling bar 28b protrudes outward beyond the short sides of the first end plate 24a and the second end plate 24b, and the coupling bar 28b is spaced from the fuel cells 18. In the structure, after the external load F applied to the projecting portion 71b is transmitted to the coupling bar 28b, the external load F is transmitted to the first end plate 24a and the second end plate 24b to which the coupling bar 28b is fixed. At this time, the external load F is not transmitted to the fuel cells 18.

As shown in FIGS. 1 and 2, the first end plate 24a and the second end plate 24b are directly fixed to the frame member 86 through the mount members 84a, 84b. Therefore, after the external load F is transmitted from the first end plate 24a and the second end plate 24b to the frame member 86, the external load F is transmitted to the vehicle body frame 92 through the side frames 90 to which the frame member 86 is fixed.

In the first embodiment of the present invention, when the external load F is applied from the front side in the traveling direction of the vehicle, after the external load F is transmitted from the radiator 96, the projecting portion 71b of the casing 16, and the coupling bar 28b to the first end plate 24a and the second end plate 24b, the external load F is transmitted from the frame member 86 to the vehicle body frame 92 through the side frames 90.

Therefore, the external load F is not directly applied to the fuel cells 18 of the fuel cell stack 14, and the external load F can be reliably released to the vehicle body frame 92. Accordingly, with the simple structure, it becomes possible to suitably prevent the external load F from being applied directly to the fuel cells 18, and reliably protect the fuel cells 18 advantageously.

A gap may be formed between the coupling bar 28b and the projecting portion 71b of the casing 16. In this case, after the external load F is transmitted from the radiator 96 and the projecting portion 71b of the casing 16 to the first end plate 24a and the second end plate 24b, the external load F is transmitted from the frame member 86 to the vehicle body frame 92 through the side frames 90.

Figure 6:
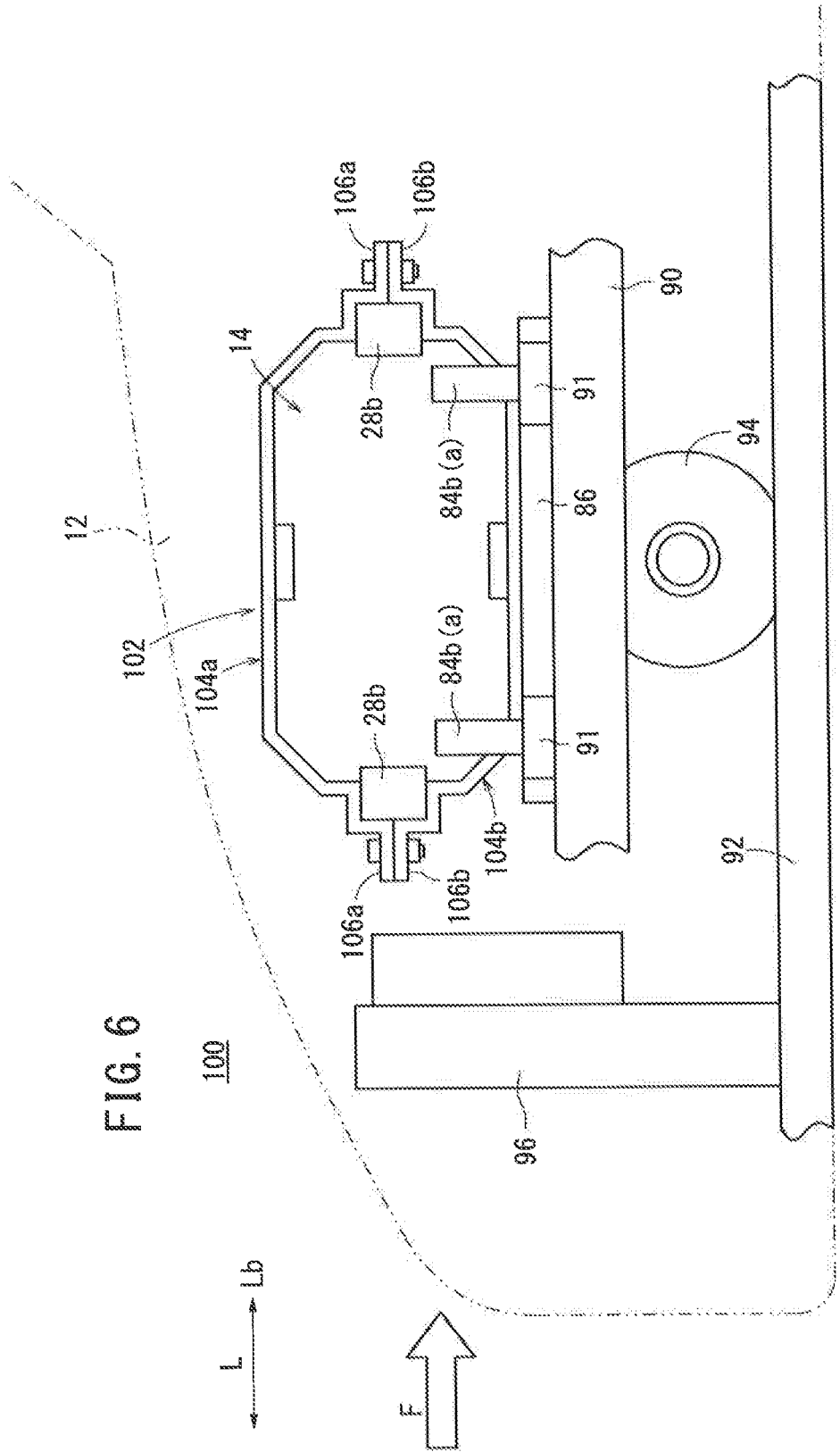
FIG. 6 is a side view showing a fuel cell vehicle according to a second embodiment of the present invention.

FIG. 6 is a cross sectional view showing main components of a fuel cell vehicle 100 according to a second embodiment of the present invention. The constituent elements that are identical to those of the fuel cell vehicle 10 according to the first embodiment are labeled with the same reference numerals, and description thereof will be omitted. Further, also in a third embodiment described later, the constituent elements that are identical to those of the fuel cell vehicle 10 according to the first embodiment are labeled with the same reference numerals, and description thereof will be omitted.

Figure 7:
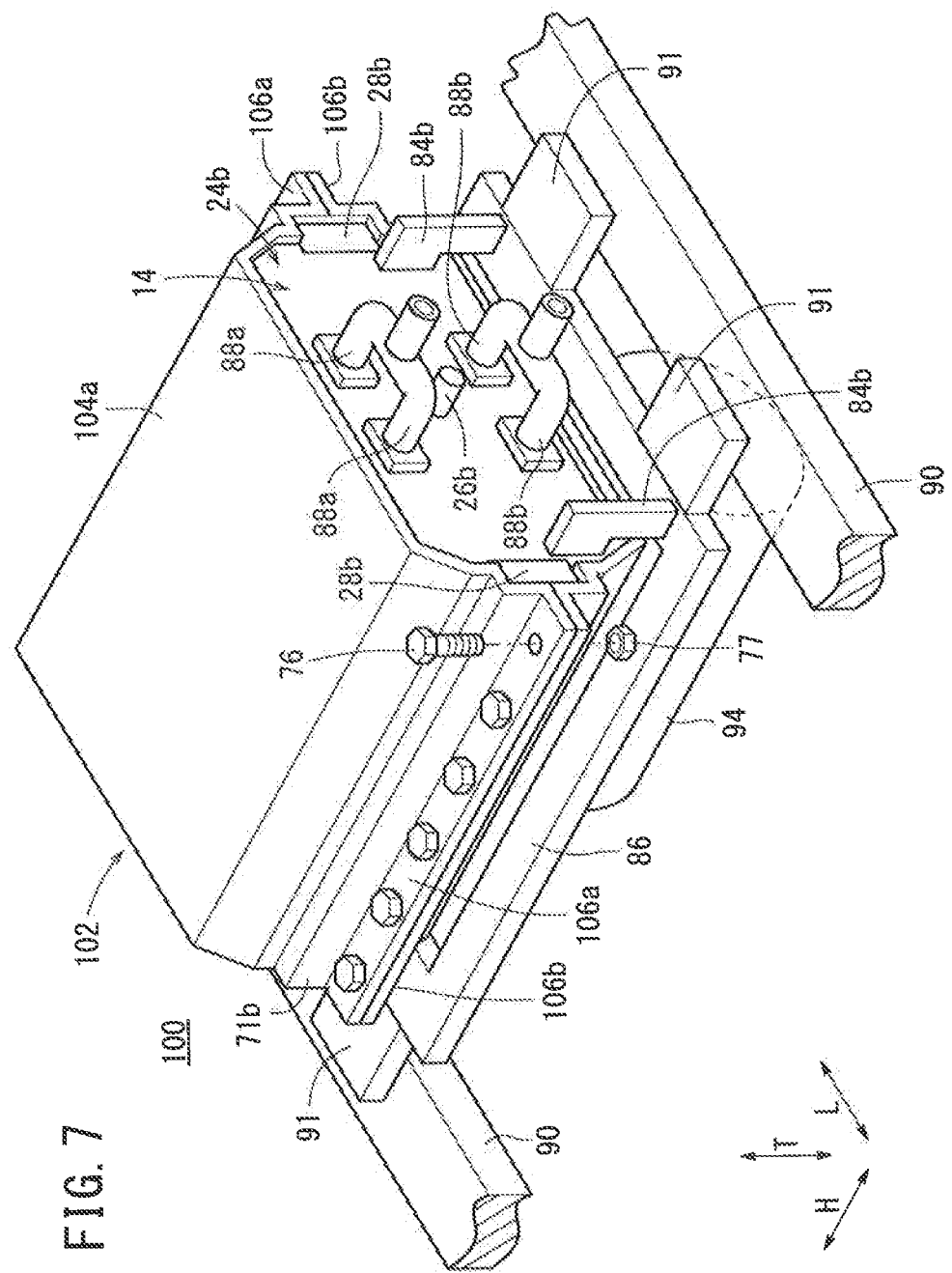
FIG. 7 is a perspective view showing a fuel cell stack and a casing of the fuel cell vehicle.

As shown in FIGS. 6 and 7, the fuel cell vehicle 100 includes a casing 102 containing the fuel cell stack 14. The casing 102 has a plurality of, e.g., two, split members 104a, 104b having split surfaces on the short sides of the fuel cells 18, in the longitudinal direction indicted by the arrow H. In the state where the split members 104a, 104b are joined together from the upper and lower directions of the fuel cell stack 14, the split members 104a, 104b jointly form a tubular shape, in particular, form a polygonal tubular shape corresponding to the outer shape of the fuel cell stack 14.

The split members 104a, 104b have the split surfaces at positions where the coupling bars 28b are provided. At the opening ends of the split member 104a which extend in the longitudinal direction, flanges 106a protruding outward in the horizontal direction are provided. The flanges 106a form the split surfaces.

In the same manner as in the case of the split member 104a, at the opening ends of the split member 104b extending in the longitudinal direction, flanges 106b protruding outward in the horizontal direction are provided. The flanges 106b form the split surfaces.

The flanges 106a, 106b are fixed using bolts 76 and nuts 77 to join the split members 104a, 104b together. In the casing 102, one pair of the flanges 106a, 106b that protrude from the fuel cell stack 14 toward the front side in the traveling direction of the vehicle forms a load receiver member.

In the second embodiment having the above structure, in the order from the front side to the rear side in the traveling direction of the vehicle, a radiator 96, the flanges 106a, 106b (load receiver member) of the casing 102, and the coupling bar 28b (tightening member) of the fuel cell stack 14 are arranged in the front box 12.

In the structure, when the external load F is applied from the front side in the traveling direction of the vehicle, after the external load F is transmitted from the radiator 96, the flanges 106a, 106b of the casing 16, and the coupling bar 28b to the first end plate 24a and the second end plate 24b, the external load F is transmitted from the frame member 86 to the vehicle body frame 92 through the side frames 90.

Therefore, the external load F is not directly applied to the fuel cells 18 of the fuel cell stack 14, and the external load F can be reliably released to the vehicle body frame 92.

Accordingly, with the simple structure, the same advantages as in the case of the first embodiment are obtained. For example, it becomes possible to suitably prevent the external load F from being directly applied to the fuel cell stack 14, and protect the fuel cell stack 14 advantageously.

Figure 8:
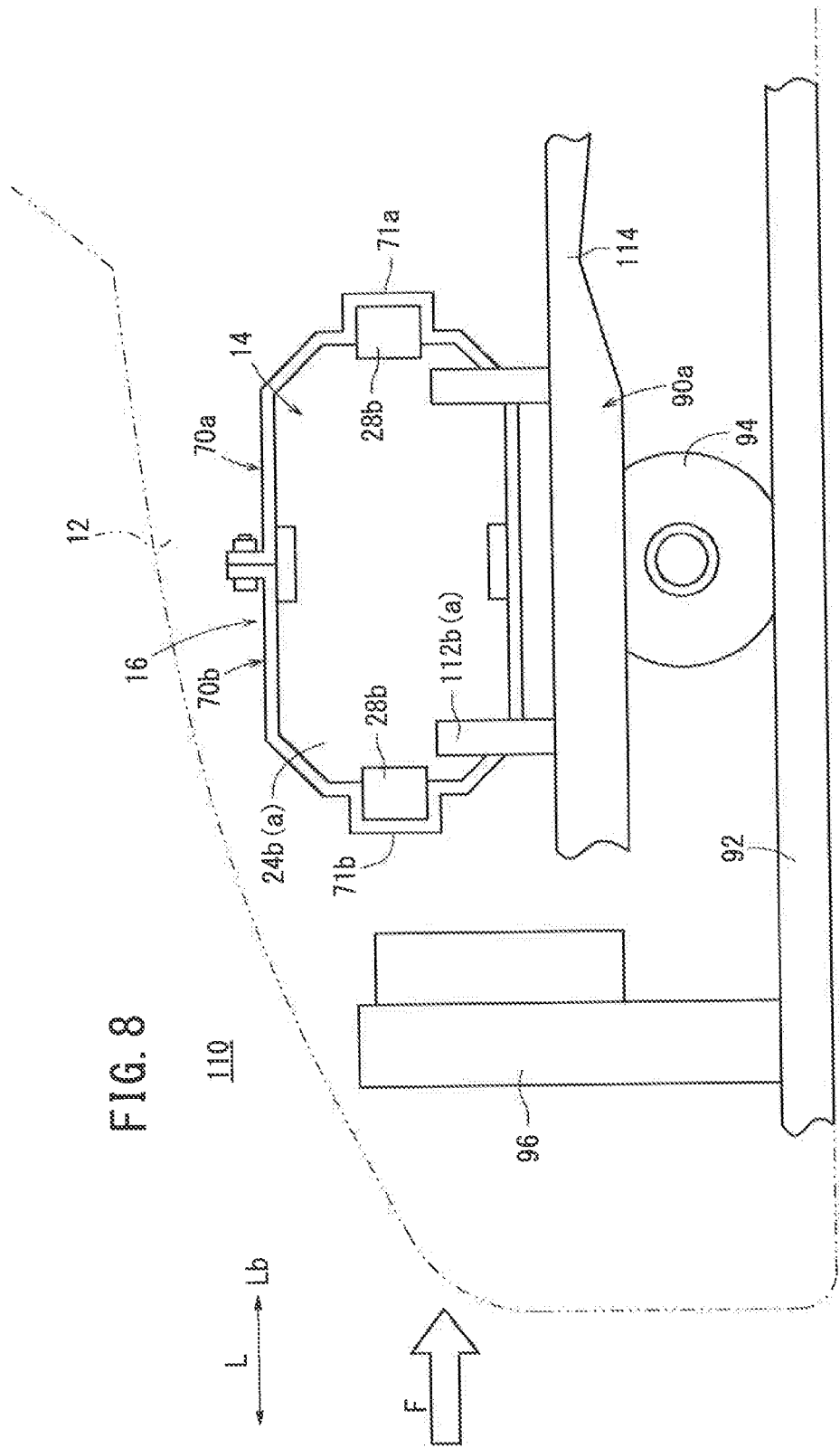
FIG. 8 is a side view showing a fuel cell vehicle according to a third embodiment of the present invention.
Figure 9:
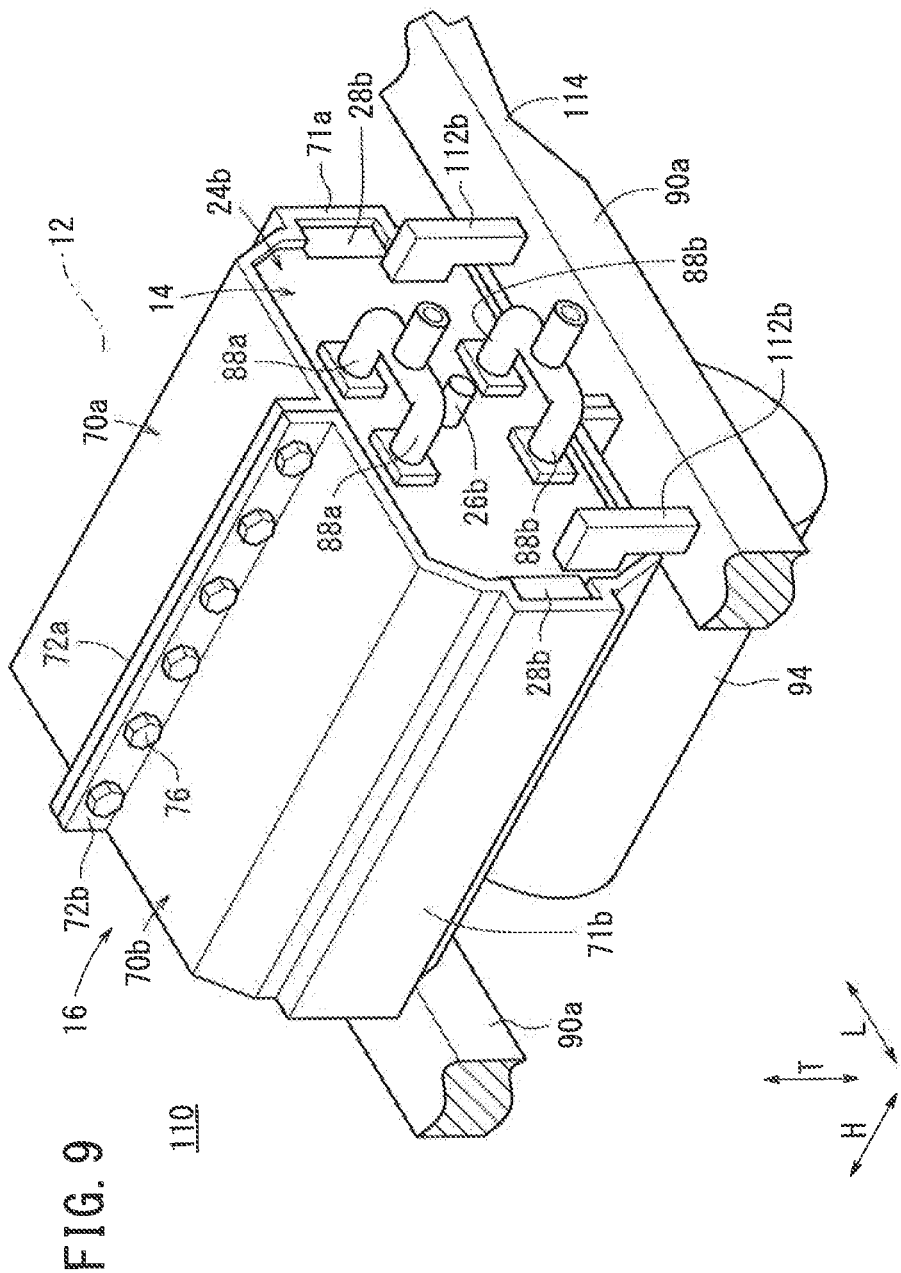
FIG. 9 is a perspective view showing main components of the fuel cell vehicle.

As shown in FIGS. 8 and 9, in a fuel cell vehicle 110 according to the third embodiment of the present invention, the fuel cell stack 14 is placed in a casing 16. The fuel cell stack 14 is directly fixed to side frames 90a without using the frame member 86.

One end of each of a pair of mount members 112a is fixed to the first end plate 24a, and another end thereof is fixed to the side frame 90a. One end of each of a pair of mount members 112b is fixed to the second end plate 24b, and another end thereof is fixed to the side frame 90a. The side frame 90a includes a strength-reduction portion 114 having a reduced strength and which is formed by cutting out, in the height direction, a portion of the side frame 90a at a predetermined position in the direction indicated by the arrow L.

In the third embodiment having the above structure, when the external load F is applied from the front side in the traveling direction of the vehicle, after the external load F is transmitted from the radiator 96, the projecting portion 71b of the casing 16 (and the coupling bar 28b as necessary) to the first end plate 24a and the second end plate 24b, the external load F is transmitted to the vehicle body frame 92 through the side frames 90a.

Therefore, the external load F is not directly applied to the fuel cells 18 of the fuel cell stack 14, and the external load F can be more reliably released to the side frames 90a and the vehicle body frame 92. Thus, it becomes possible to prevent damage to the fuel cells 18 caused by stress concentration.

Further, the strength-reduction portion 114 is provided in the side frame 90a. Thus, when the external load F is applied, the side frame 90a is bent at the strength-reduction portion 114. Therefore, it becomes possible to reliably absorb the external load F, and suitably protect the fuel cells 18 advantageously.

The invention claimed is:

1. A fuel cell vehicle including a fuel cell stack formed by stacking a plurality of fuel cells in a vehicle width direction, the fuel cells each generating electrical energy by electrochemical reactions of a fuel gas and an oxygen-containing gas,
    wherein the fuel cell stack includes end plates provided at both ends of the fuel cells in a stacking direction so as to be distanced from each other in the vehicle width direction, at least one of tightening members coupling the end plates being disposed on a front side of the fuel cell stack in a vehicle traveling direction so as to be spaced from the fuel cells;
    in the order from the front side to a rear side in the vehicle traveling direction, a fuel cell cooling radiator, a casing containing therein the fuel cell stack, and the tightening member are provided in an inside of a vehicle body, an inner surface of the casing being disposed around outer circumferences of the end plates through seal members such that the casing and the end plates together form a housing accommodating the fuel cells; and
    the end plates are fixed to a vehicle body frame in a manner that, when an external load is applied from the front side in the vehicle traveling direction, after the external load is transmitted from at least the fuel cell cooling radiator, the casing and the tightening member to the end plates, the external load is transmitted to the vehicle body frame,
    wherein the casing is split in a direction orthogonal to the stacking direction into symmetric first and second members,
    wherein each of the first and second members has an arch shape spanning from a first flange to a second flange in cross section taken along a plane parallel to the end plates, and
    wherein the first and second members are configured to be joined together at their respective first and second flanges.

2. The fuel cell vehicle according to claim 1, wherein the casing is partially provided on the front side of the fuel cell stack in the vehicle traveling direction to form a load receiver member.

3. The fuel cell vehicle according to claim 2, wherein the load receiver member comprises a projecting portion of the casing or a flange of the casing.

4. The fuel cell vehicle according to claim 1,
    wherein the first flange is disposed below the fuel cell stack and the second flange is disposed above the fuel cell stack, and
    wherein the first and second members each rise in opposite directions from the first and second flanges to a respective projection configured to fit over the respective tightening member thereby enclosing the tightening members within the casing.

5. The fuel cell vehicle according to claim 1, wherein the casing is partially provided on the front side of the fuel cell stack in the vehicle traveling direction to form a load receiver member.

* * * * *